(12) United States Patent
Tanaka

(10) Patent No.: US 10,775,584 B2
(45) Date of Patent: Sep. 15, 2020

(54) LENS APPARATUS AND IMAGE PICKUP APPARATUS

(71) Applicant: CANON KABUSHIKI KAISHA, Tokyo (JP)

(72) Inventor: Yuhei Tanaka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 16/001,706

(22) Filed: Jun. 6, 2018

(65) Prior Publication Data
US 2018/0364448 A1 Dec. 20, 2018

(30) Foreign Application Priority Data
Jun. 14, 2017 (JP) ................. 2017-117191

(51) Int. Cl.
*G02B 7/10* (2006.01)
(52) U.S. Cl.
CPC ..................... *G02B 7/10* (2013.01)

(58) Field of Classification Search
CPC .......... G02B 7/10; G02B 7/022; G02B 7/023; G02B 7/026; G02B 7/04
See application file for complete search history.

(56) References Cited

FOREIGN PATENT DOCUMENTS

| JP | 08-304688 A | 11/1996 |
|---|---|---|
| JP | 2007286173 A | 11/2007 |
| JP | 2009-80437 A | 4/2009 |
| JP | 2009244585 A | 10/2009 |
| JP | 2017075785 A | 4/2017 |

*Primary Examiner* — Jack Dinh
(74) *Attorney, Agent, or Firm* — Canon U.S.A., Inc. IP Division

(57) ABSTRACT

A lens apparatus includes a movable barrel holding an optical member, and including a screw portion on an outer or inner surface thereof; and a fixed barrel including a screw portion screwed with the screw portion of the movable barrel, and configured to move the movable barrel in an optical axis direction thereof. A pressed portion is provided for one of the fixed barrel and the movable barrel whose outer surface includes the screw portion, and a pressing portion is provided for the other of the fixed barrel and the movable barrel whose inner surface includes the screw portion. The pressed portion is pressed by the pressing portion.

12 Claims, 7 Drawing Sheets

LENS APPARATUS AND IMAGE PICKUP APPARATUS

BACKGROUND OF THE INVENTION

Field of the Invention

The disclosure relates to a lens apparatus and an image pickup apparatus.

Description of the Related Art

A lens apparatus that causes a movable barrel holding an optical member such as a lens to be moved in an optical axis direction by helicoid mechanism to perform a focus or zoom operation has been known. In general, a helicoid unit includes a fixed barrel and a movable barrel that are screwed together via screw portions. The fixed barrel is configured such that rotation around an optical axis is regulated, whereas the movable barrel is configured to be rotatable around the optical axis. When rotation operation is performed on the movable barrel, the movable barrel makes relative movement back and forth in an optical axis direction with respect to the fixed barrel.

However, play is more easily generated in the optical axis direction and a radial direction due to tolerances or manufacturing errors that are generated in the screw portions of the movable barrel and the fixed barrel. In recent years, since high quality images are particularly demanded, a lens apparatus with play that is suppressed is expected.

Japanese Patent Application Laid-Open No. 2009-80437 discusses structure in which play in a helicoid unit is suppressed by arrangement of a metal sphere between threads of a screw portion provided around a movable barrel and arrangement of an elastic member that urges the metal sphere. In Japanese Patent Application Laid-Open No. 8-304688, first and second barrel members separated in an optical axis direction are connected by an elastic member. The elastic member urges a third barrel member that is screwed onto the first and second barrel members, so that play between the first and third barrel members and play between the second and third barrel members in helicoid mechanism are suppressed.

However, in the configurations discussed in each of Japanese Patent Application Laid-Open No. 2009-80437 and Japanese Patent Application Laid-Open No. 8-304688, a screw portion is urged. This may cause the screw portion to be abraded, and such abrasion may increase play. Moreover, abrasion powder may be generated. If such abrasion powder is caught in a screwed portion between the screw portions, the operability of a lens apparatus may be degraded, or the optical performance of the lens apparatus may be degraded due to image skipping (screw thread skipping). Moreover, according to the configuration discussed in Japanese Patent Application Laid-Open No. 2009-80437, the metal sphere needs to be arranged between the threads of the screw portion. Since a distance between the threads is small, assembly is difficult.

SUMMARY OF THE INVENTION

The disclosure is directed to, for example, a lens apparatus advantageous in smallness of play in screw portions between a fixed barrel and a movable barrel included therein, and assembly thereof.

According to an aspect of the disclosure, a lens apparatus includes a movable barrel holding an optical member, and including a screw portion on an outer or inner surface thereof, and a fixed barrel including a screw portion screwed with the screw portion of the movable barrel, and configured to move the movable barrel in an optical axis direction thereof. A pressed portion is provided for one of the fixed barrel and the movable barrel whose outer surface includes the screw portion, and a pressing portion is provided for the other of the fixed barrel and the movable barrel whose inner surface includes the screw portion. The pressed portion is pressed by the pressing portion.

Further features and aspects of the disclosure will become apparent from the following description of multiple example embodiments with reference to the attached drawings.

DESCRIPTION OF THE EMBODIMENTS

Numerous example embodiments and features thereof will hereinafter be described in detail with reference to the attached drawings.

(Configuration of Optical Members)

Figure 1:
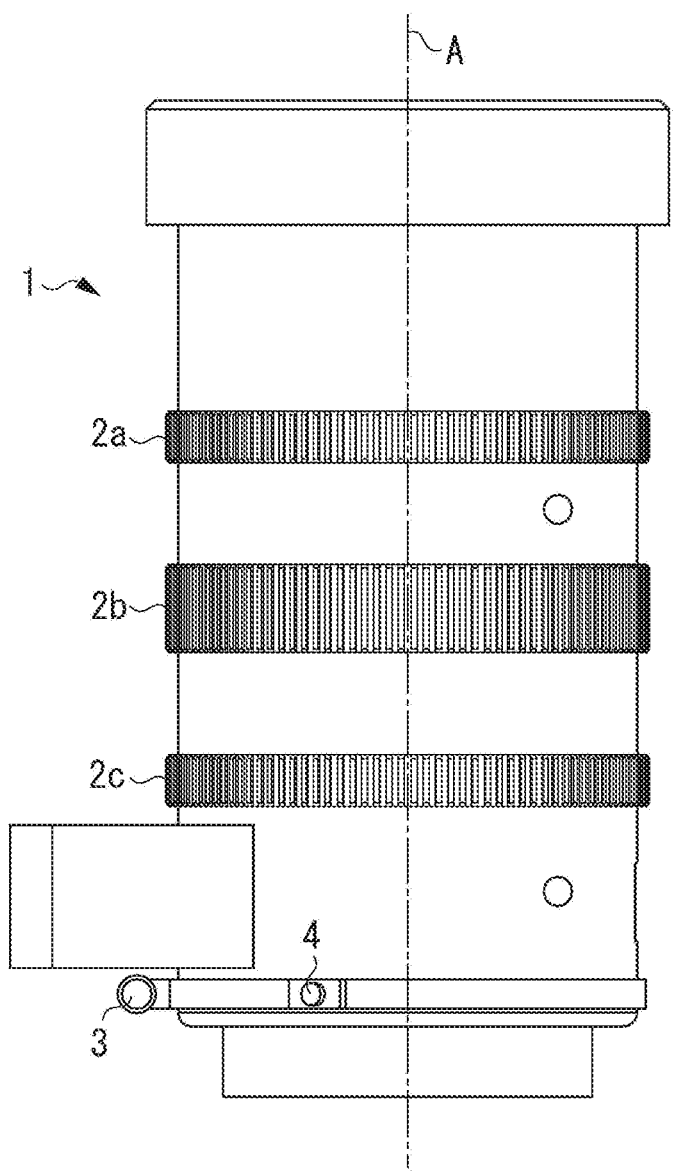
FIG. 1 is a diagram illustrating an overall example configuration of a zoom lens system.
Figure 2:
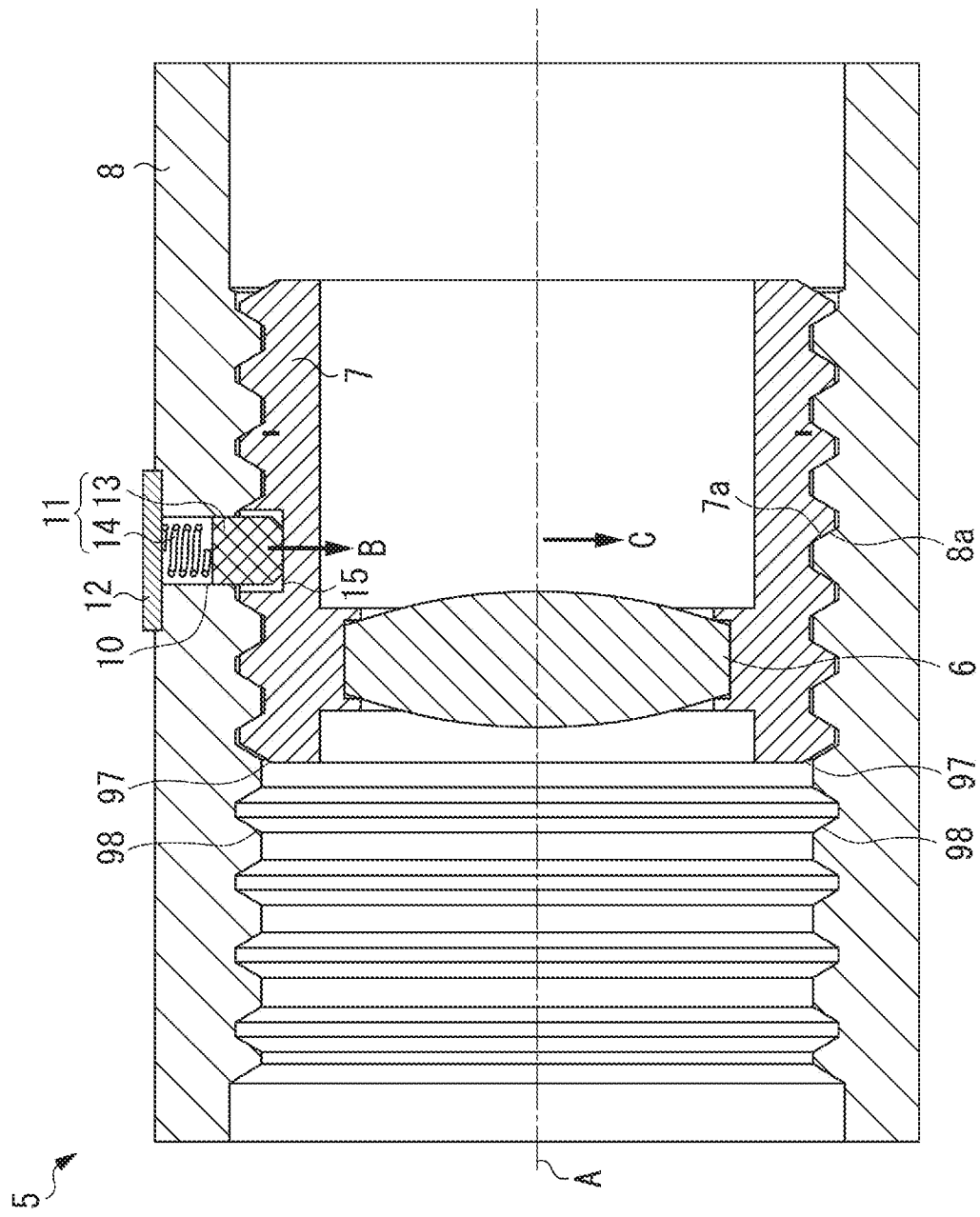
FIG. 2 is a detailed diagram illustrating a play suppression structure according to a first example embodiment.
Figure 3:
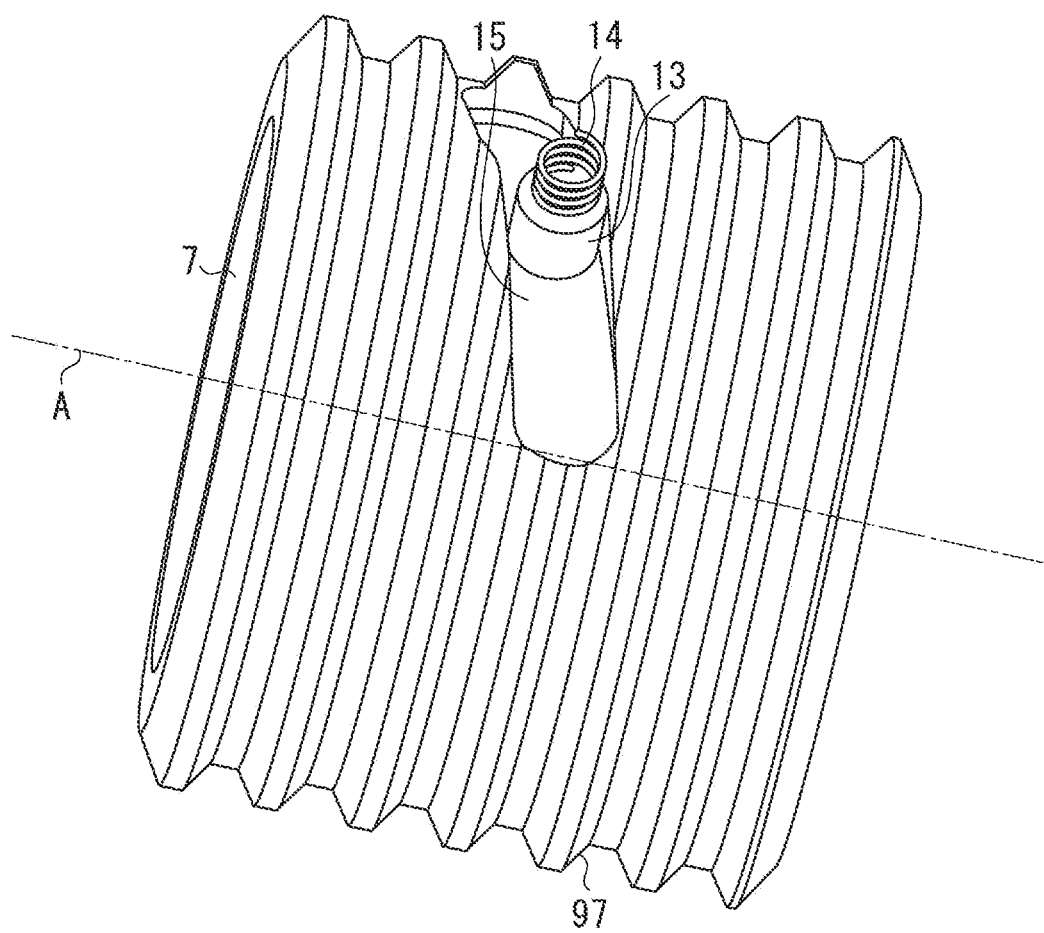
FIG. 3 is a perspective view illustrating the play suppression structure according to the first example embodiment.

FIG. 1 is a diagram illustrating an overall configuration of a zoom lens system (a lens apparatus) in an example embodiment. FIG. 2 is a detailed diagram illustrating a play suppression structure according to a first example embodiment. FIG. 3 is a perspective view of the play suppression structure according to the first example embodiment. The structure of a screw portion is simplified to illustrate a concept thereof. Similarly, in each of the diagrams described below, the structure of a screw portion is simplified to illustrate a concept thereof.

First, an overall configuration of the zoom lens system (lens apparatus) according to the present example embodiment is described with reference to FIG. 1.

In the lens apparatus 1, when a focus operation ring 2a is rotated, a movable optical unit (not illustrated) held by a movable barrel (not illustrated) moves along a direction of an optical axis A. Thus, focus adjustment is made.

Moreover, when a zoom operation ring 2b is rotated, the movable optical unit moves along the optical axis A direction, so that zoom adjustment is made.

Moreover, when an iris operation ring 2c is rotated, a diameter of a diaphragm changes. Such a change in diaphragm diameter adjusts an amount of light.

Moreover, when a flange back (F.B.) operation ring 3 or a macro operation ring 4 is rotated, the movable optical unit moves in the optical axis A direction, so that an in-focus distance to an image pickup element is adjusted.

The overall example configuration of the zoom lens system has been described above.

(Configuration of Helicoid Unit)

Next, a helicoid unit 5 in internal structure of the lens apparatus 1 is described with reference to FIG. 2.

The movable optical unit includes a lens unit (an optical member) 6, a movable barrel 7 that holds the lens unit 6, and a press ring (not illustrated) by which the lens unit 6 is positioned in the optical axis A direction with respect to the movable barrel 7.

The helicoid unit 5 includes a male helicoid (a screw portion) 97 and a female helicoid (a screw portion) 98 that are screwed together. The male helicoid 97 is arranged on an outer circumferential surface of the movable barrel 7, whereas the female helicoid 98 is arranged on an inner circumferential surface of a fixed barrel 8.

The movable barrel 7 is connected to an operation ring (not illustrated) arranged on an outer circumference of the fixed barrel 8 with a pin (not illustrated).

With such structure, the movable barrel 7 is movably screwed in an optical axis direction onto an inner side of the fixed barrel 8. That is, the movable optical unit (i.e., the movable barrel 7) is rotated via an operation ring. At the same time, the movable optical unit moves straight along the direction of the optical axis A. A direction of the straight movement varies depending on a direction in which the movable barrel 7 is rotated.

The configuration of the helicoid unit 5 has been described above.

(Configuration of Play Suppression Unit)

Next, a configuration of a play suppression structure in the helicoid unit 5 is described with reference to FIGS. 2 and 3.

On a side surface of the fixed barrel 8, an opening 10 is formed such that one portion of the movable barrel 7 is exposed. A pressing unit 11 (pressing mechanism) that presses the movable barrel 7 is inserted into the opening 10. In the present example embodiment, an orientation (a direction) in which the pressing unit 11 is inserted is a direction substantially perpendicular to the optical axis A in cross section including the optical axis A.

The pressing unit 11 includes a pressing portion 13 and a spring member (an urging member) 14. The pressing portion 13 is fitted into the opening 10 formed in the fixed barrel 8. The pressing portion 13 is preferably fitted at least in a direction of the optical axis A. In this case, the opening 10 can function as a position regulator for the pressing portion 13 in the optical axis A direction.

Moreover, the opening 10 and the pressing unit 11 are sealed by a sealing member (a cover member) 12. The sealing member 12 is fixed to the fixed barrel 8. The spring member 14 is arranged between the sealing member 12 and the pressing portion 13. The spring member 14 urges the pressing portion 13 toward the movable barrel 7 from the sealing member 12.

In the present example embodiment, an urging force is generated by the spring member 14. However, the urging member is not limited to the spring member 14. For example, a rubber member or an elastically deformable resin member can be used.

A groove 15 extending in a circumferential direction of the movable barrel 7 is formed in the movable barrel 7. The groove 15 is formed separately from the male helicoid 97. A pressing portion 13 contacts a bottom surface (a pressed portion) of the groove 15 by using the urging force of the spring member 14.

In the present example embodiment, the groove 15 has a helical shape around an optical axis. The bottom surface of the groove 15 is exposed to the outside via the opening 10. The entire bottom surface of the groove 15 is not necessarily exposed from the opening 10. The bottom surface of the groove 15 may be exposed such that at least one portion thereof is pressed according to size of the pressing portion 10 or an amount of movement of the lens unit (the optical member) 6.

The groove 15 has a width that is desirably greater than a width of the pressing portion 13 in cross section including the optical axis A. If a length of the groove 15 in an optical axis direction in cross section including the optical axis A is greater than a length of the pressing portion 13 in the optical axis direction in a state in which the pressing portion 13 is set in a lens barrel, assembly is easier. Moreover, a circumferential length of the groove 15 is determined according to an amount of movement made by the movable optical unit in the optical axis direction (according to a rotation range of the movable barrel 7).

In the present example embodiment, with such configuration, the pressing unit 11 presses the movable barrel 7 not only in a radial direction of the movable barrel 7 but also toward the optical axis A.

The configuration of the play suppression structure of the present example embodiment has been described above.

(Effect of Play Suppression Structure)

Next, an effect of the play suppression structure is described with reference to FIG. 2.

The pressing portion 13 is fitted into and guided by the opening 10, and a pressing force of the pressing portion 13 is applied in a direction indicated by an arrow B in FIG. 2. The direction is not only the radial direction of the movable barrel 7 but also toward the optical axis A as described above. The use of such a pressing force presses the movable barrel 7 toward a direction indicated by an arrow C in FIG. 2.

When the movable barrel 7 is pressed in the direction indicated by the arrow C, an inclined surface 7a of the male helicoid 97 and an inclined surface 8a of the female helicoid 98 contact each other. Since the inclined portions contact each other, play in the direction indicated by the arrow C is suppressed. At the same time, play in the direction of the optical axis A is suppressed.

Moreover, since the pressing portion 13 is fitted into the opening 10, the pressing portion 13 is uniquely positioned in the optical axis A direction. In this configuration, the pressing portion 13 does not need to be set after adjustment is made such that the pressing portion 13 is positioned between threads of the female helicoid 98. Instead, the pressing portion 13 is simply inserted into the opening 10, and thus workability is enhanced.

That is, according to an assembly method for the lens apparatus of the present example embodiment, in an initial step, the movable barrel 7 on which the groove 15 is formed, the fixed barrel 8 on which the opening 10 is formed, the pressing portion 13, the spring member 14, and the sealing member 12 are prepared. In a next step, the fixed barrel 8 and the movable barrel 7 are screwed together. A position in which the fixed barrel 8 and the movable barrel 7 are screwed does not necessarily need an adjusted predetermined position. In particular, the movable barrel 7 and the fixed barrel 8 can be screwed each other such that the movable barrel 7 is provided within a range in which the movable barrel 7 actually moves with respect to the fixed barrel 8.

In a subsequent step, the pressing portion 13 and the spring member 14 are inserted into the opening 10. In the last step, the opening 10 is closed by the sealing member 12. With these steps, the lens apparatus that reduces play by causing the spring member 14 to urge the pressing portion 13 toward a surface of the groove 15 can be assembled.

Moreover, since the pressing portion 10 does not directly press the male helicoid 97, damage to the male helicoid 97 caused by the pressing portion 10 is very small. Moreover, as mentioned above, the pressing portion 10 presses the bottom surface of the groove 15. If the bottom surface of the groove 15 is abraded, abrasion powder generated by the abrasion remains on the bottom of the groove 15. This can reduce an amount of the abrasion powder to be interposed between the male helicoid 97 and the female helicoid 98. Therefore, deterioration in operability and degradation in optical performance can be suppressed, and lens quality can be enhanced.

(Modification Example of Pressed Portion)

In the present example embodiment, the pressed portion which is to be pressed by the pressing portion 10 has been described as the bottom surface of the groove 15. However, the pressed portion is not limited thereto. For example, a V-shaped groove having a V shape in cross section including an optical axis is formed, and both side surfaces of the V-shaped groove can be used as a pressed portion.

That is, if any surface out of surfaces having helical groove shape around an optical axis is used as a pressed portion, the present example embodiment can be executed.

Figure 4:
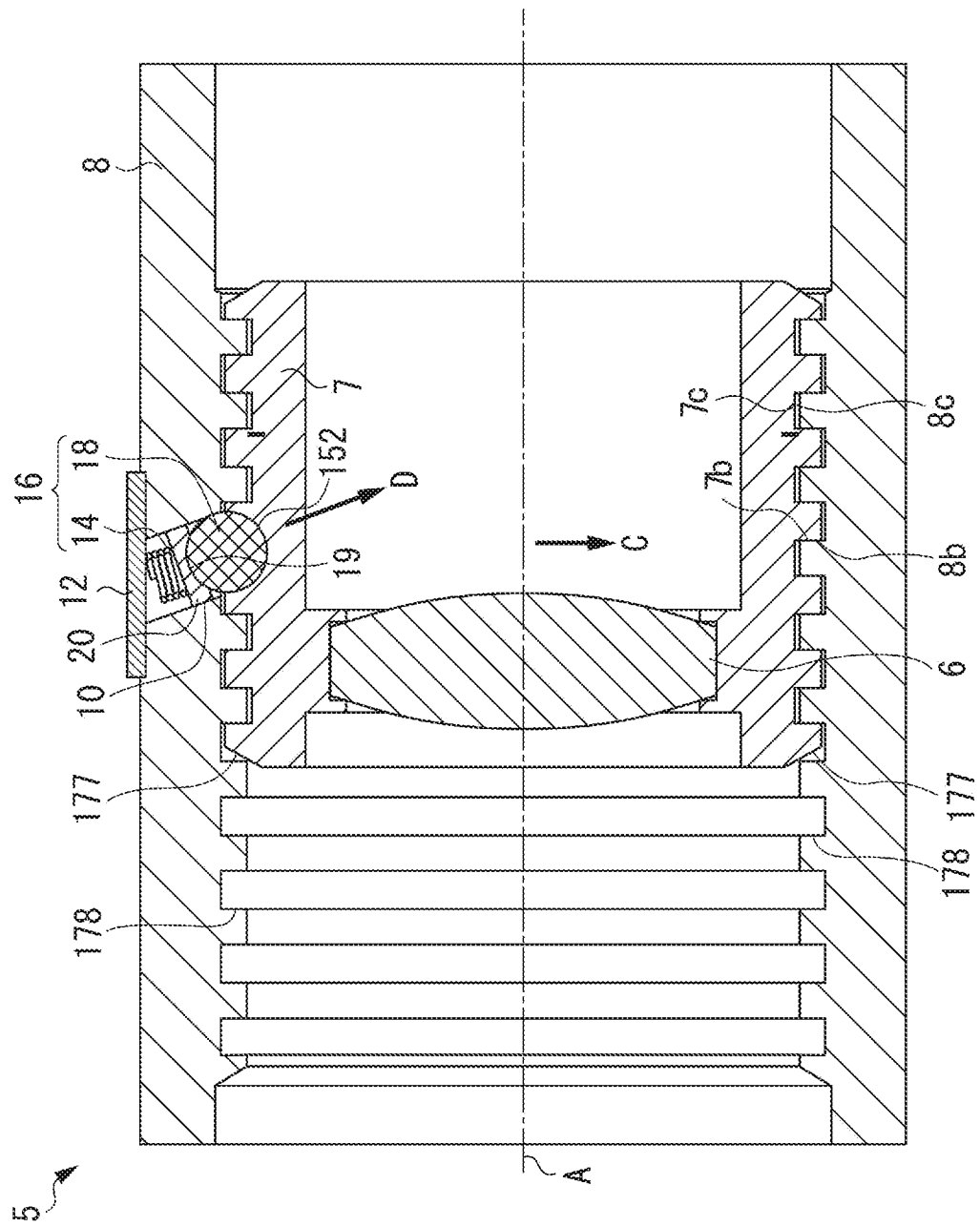
FIG. 4 is a detailed diagram illustrating a play suppression structure according to a second example embodiment.

FIG. 4 is a detailed diagram illustrating a play suppression structure according to a second example embodiment. A lens apparatus of the present example embodiment is described with reference to FIG. 4.

In the present example embodiment, a pressing unit 16 (pressing mechanism), and helicoids (a male helicoid 177 and a female helicoid 178) formed between a movable barrel 7 and a fixed barrel 8 differ with respect to the first example embodiment. Other components are substantially the same as those in the first example embodiment. Hereinafter, components and configurations that differ from those of the first example embodiment will be described, and the same reference numerals as above will be given to like components and description thereof will be omitted.

(Example Configuration)

In the present example embodiment, an opening 10 is formed to pass through the fixed barrel 8 in a direction indicated by an arrow D in FIG. 4 (not only in a direction perpendicular to an optical axis A or an axis of the movable barrel 7, but also in a direction approaching and inclining to an object side or an image surface side as it approaches the optical axis A). That is, the opening 10 is formed in a direction in which an angle formed with an axis of the movable barrel 7 is an acute angle. The pressing unit 16 is inserted along the opening 10. Accordingly, in the present example embodiment, the pressing unit 16 presses the movable barrel 7 in the direction indicated by the arrow D. Such a pressing force acts in a direction perpendicular to the optical axis A and a direction along the optical axis A.

The pressing unit 16 includes a pressing portion 18 having a spherical shape, a holding plate 20 including a holding unit 19 that holds the pressing portion 18, and a spring member (an urging member) 14 that presses the holding plate 20 from a sealing member (a cover member) 12. The holding unit 19 has a hemispherical concave shape to hold the spherical pressing portion 18. The holding plate 20 is fitted into the opening 10 arranged in the fixed barrel 8.

The pressing portion 18 is pressed to a pressed portion 152 provided on the male helicoid 177 of the movable barrel 7 by using an urging force generated by the spring member 14. In the present example embodiment, the pressed portion 152 has such a groove shape that a sectional shape in a plane including the optical axis A is hemispherical. The shape of the pressed portion 152 is not limited thereto as described below.

In the present example embodiment, as illustrated in FIG. 4, the male helicoid (the screw portion) 177 and the female helicoid (the screw portion) 178 have threads the sectional shape in a plane including the optical axis A of which is rectangle.

(Effects)

According to such configurations, the following effects can be acquired in addition to the effects acquired by the first example embodiment.

If the male helicoid 177 and the female helicoid 178 have threads the sectional shape in a plane including the optical axis A of which is similar to rectangle as similar to the present example embodiment, play in an optical axis A direction cannot be sufficiently suppressed even though the movable barrel 7 is pressed from a direction perpendicular to the optical axis A direction. The case where the male helicoid 177 and the female helicoid 178 have threads the sectional shape in a plane including the optical axis A of which is similar to rectangle represents, for example, a case where a member such as a trapezoidal screw thread is used.

In the second example embodiment, since the pressing unit 16 is configured to press a pressed portion from a direction (indicated by the arrow D) obliquely intersecting with the optical axis A, the movable barrel 7 is pressed in the optical axis A direction. Thus, a surface 7b orthogonal to the optical axis A direction of the movable barrel 7 in a helicoid 177 and a surface 8b orthogonal to the optical axis A direction of the fixed barrel 8 in the helicoid 178 contact each other. At the same time, a surface 7c along the optical axis A direction of the movable barrel 7 in the helicoid 177 and a surface 8c along the optical axis A direction of the fixed barrel 8 in the helicoid 178 contact each other.

Accordingly, even if the helicoid 17 has a thread the sectional shape in a plane including the optical axis A of which is similar to rectangle, an effect in which play in the optical axis A direction and a direction C perpendicular to the optical axis A is suppressed can be acquired.

In the present example embodiment, the pressing portion 18 has a spherical shape. This reduces contact resistance with respect to a pressed portion, and influence on operational feeling can be reduced. Moreover, the pressing portion is rotatably held between an urging member and a pressed portion. Thus, friction in a contact portion between the pressing portion and the pressed portion at the time of drive of a lens is rolling friction, so that friction resistance is reduced. Hence, the influence on the operational feeling can be further reduced.

(Modification Example)

In the present example embodiment, the pressing portion 18 has a spherical shape. However, if a portion that contacts the pressed portion has a convex curved surface shape, the effect can be acquired. Moreover, the pressed portion 152 can have a rectangular groove shape in the cross section including the optical axis A. In such a case, contact resistance can be further suppressed.

As long as the pressing portion is rotatable, the effect can be acquired. For example, even if the pressing portion includes a shaft parallel to the optical axis A and a bearing, the effect can be acquired.

Figure 5:
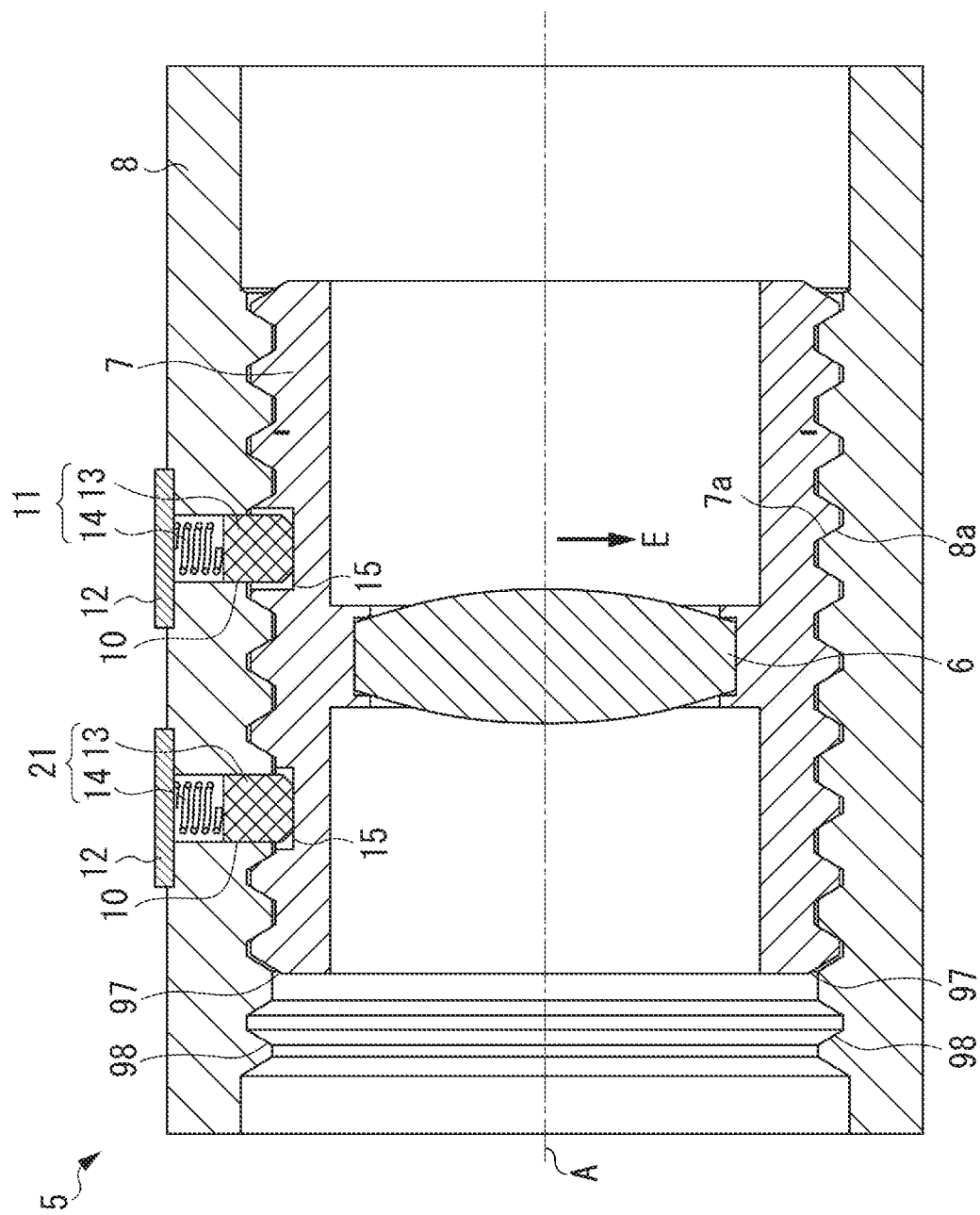
FIG. 5 is a detailed diagram illustrating a play suppression structure according to a third example embodiment.
Figure 6:
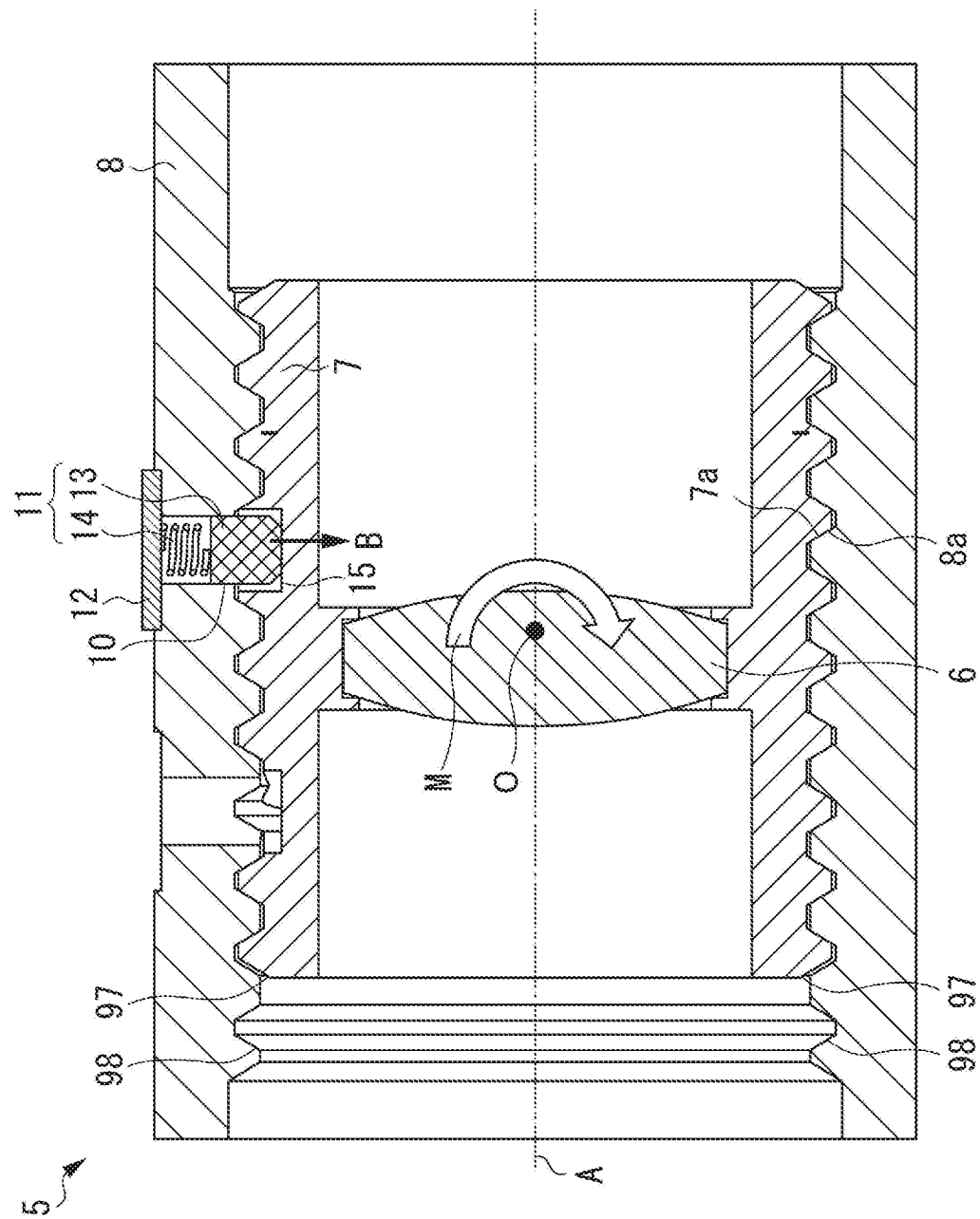
FIG. 6 is a detailed diagram illustrating a play suppression structure when a pressing unit (pressing mechanism) is arranged in one location.

FIG. 5 is a detailed diagram illustrating a play suppression structure according to a third example embodiment. FIG. 6 is a detailed diagram illustrating a play suppression structure when a pressing unit (pressing mechanism) is arranged in one location to describe an effect of the present example embodiment. Hereinafter, components and configurations that differ from those of the first example embodiment will be described, and the same reference numerals as above will be given to like components and description thereof will be omitted.

In the present example embodiment, a plurality of openings 10 is formed in a direction of an optical axis A with respect to a movable barrel 7, unlike other example embodiments.

(Example Configuration)

In the present example embodiment, the openings 10 are formed in two different locations in the optical axis A direction. A pressing unit 11 and a pressing unit 21 (pressing mechanism) are arranged with respect to the respective openings 10. A configuration of the pressing unit 21 is substantially the same as that of the pressing unit 11 described in the first example embodiment.

(Effect)

Next, an effect that is acquired when the pressing units are arranged in two different locations in the optical axis A direction is described with reference to FIG. 6.

As illustrated in FIG. 6, if a pressing unit is arranged in one location, a movable optical unit receives a moment M around a tilt center O of the movable optical unit according to the position thereof. Thus, the movable optical unit tilts toward a direction of the moment M within play of helicoids 97 and 98. This may optically degrade peripheral performance.

On the other hand, in the present example embodiment, as illustrated in FIG. 5, the pressing portions are arranged in two locations with a distance therebetween in a direction of the optical axis A. Since moments around a tilt center O of a movable optical unit act in directions in which the moments are cancelled out, the tilt can be suppressed. Accordingly, in addition to the effects of the first example embodiment, the degradation in peripheral performance can be optically suppressed.

In a case where a specific position (e.g., a position such as a principal point or a center of an optical member) in which the influence of the tilt is intended to be suppressed is arranged near the center of the two pressing portions in the optical axis direction, the influence of the tilt in the specific position can be further reduced.

Figure 7:
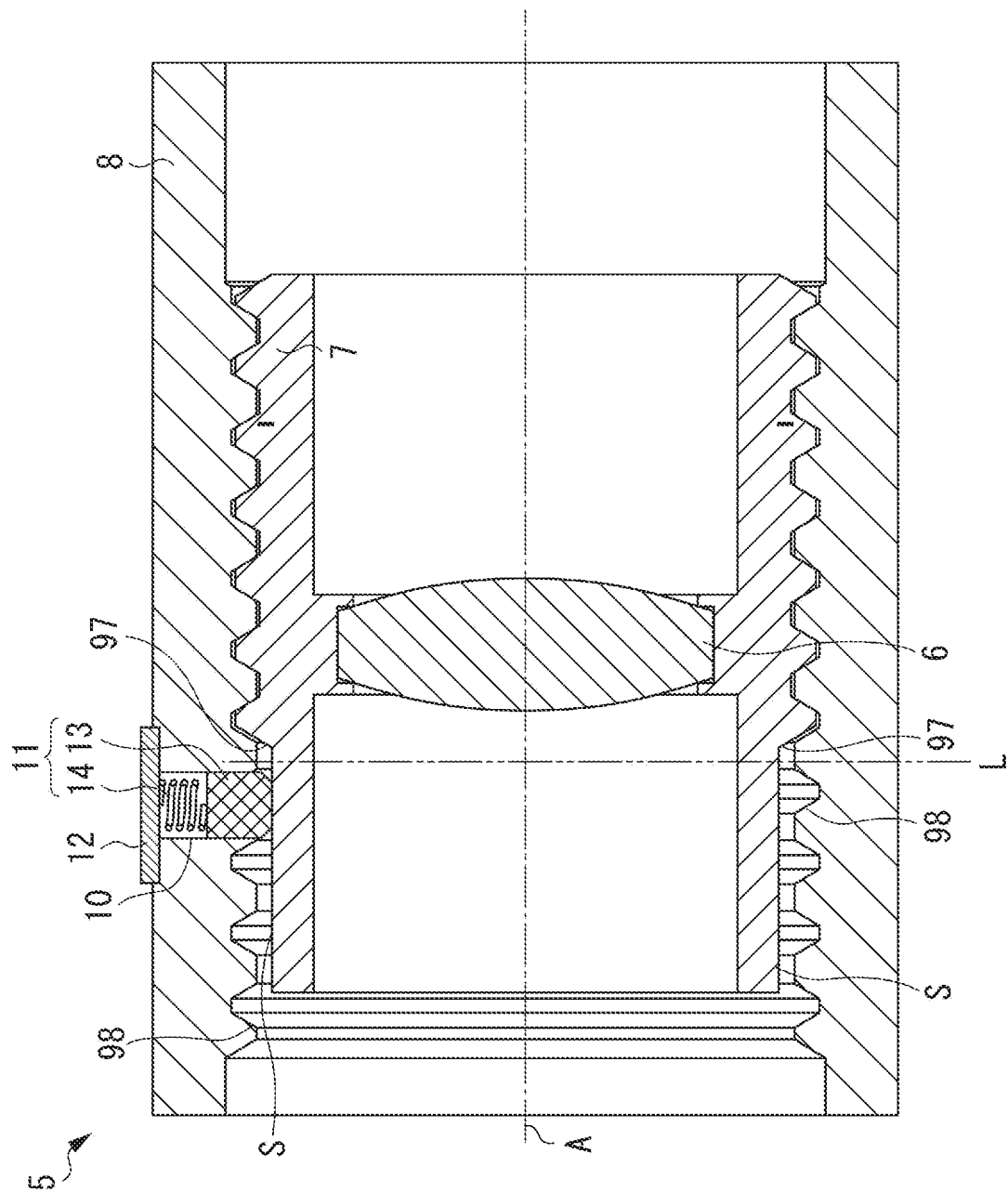
FIG. 7 is a diagram illustrating a case where the pressing unit contacts a portion other than a helicoid portion.

FIG. 7 is a detailed diagram illustrating a play suppression structure according to a fourth example embodiment. A lens apparatus according to the present example embodiment is described with reference to FIG. 7. Hereinafter, components and configurations that differ from those of the first example embodiment will be described, and the same reference numerals as above will be given to like components and description thereof will be omitted.

(Example Configuration)

In the present example embodiment, a movable barrel 7 includes an area in which a male helicoid 97 is arranged and an area S in which the male helicoid 97 is not arranged. These areas are set apart by a boundary indicated by a chain double-dashed line L. Therefore, even if a pressed portion to be formed in the movable barrel 7 does not have a groove shape, the present example embodiment can be executed.

The area S in which the male helicoid 97 is not arranged has a cylindrical surface. In the present example embodiment, the cylindrical surface has a diameter that is less than or equal to a minimum diameter of a female helicoid (a screw portion) 98 formed in a fixed barrel 8 to be screwed onto an outer side of a movable barrel 7. That is, the cylindrical surface has a diameter that is less than or equal to a diameter of a thread of the female helicoid 98. The diameter of the cylindrical surface is less than or equal to the diameter of a thread of the female helicoid 98, so that the fixed barrel 8 can accommodate the cylindrical surface of the movable barrel 7 even in an area with the female helicoid 98 there inside.

(Effect)

Therefore, the present example embodiment can provide the lens apparatus which suppresses helicoid play of a fixed barrel and a movable barrel while damage to a screw portion is small with a simpler shape, and the assembly of which is enhanced.

(Modification Example)

The present example embodiment has been described using an example in which a pressed portion includes a cylindrical surface that is set apart by the chain double-dashed line L as a boundary. However, a shape of the pressed portion is not limited to the cylindrical surface set apart by the chain double-dashed line L as a boundary. As long as the pressed portion has a shape including a surface with a generatrix that is a straight line that moves along a circumference around an axis of a movable barrel (or a fixed barrel), the present example embodiment can be executed.

An example embodiment has been described. However, the example embodiment is not limited thereto, and various modifications and changes can be made within the scope of the purport of the disclosure.

In the present example embodiment, a pressing unit (pressing mechanism) includes a pressing portion and a spring member. However, the spring member can be replaced with a rubber member. Moreover, the pressing portion and a sealing member (a cover member) may be integrally formed.

The example embodiment has been described using an example in which a male helicoid is arranged on an outer circumferential surface of a movable barrel and a female helicoid is arranged on an inner circumferential surface of a fixed barrel to screw the movable barrel onto an inner portion of the fixed barrel. However, a female helicoid may be arranged not only on an inner circumferential surface of a movable barrel but also in a range in which an optical member is not affected, and a male helicoid may be arranged on an outer circumferential surface of a fixed barrel to screw the fixed barrel onto an inner portion of the movable barrel. Even in such a case, the present example embodiment can be executed. In this case, an opening can be formed in the movable barrel, and a pressed portion can be formed in the fixed barrel.

That is, in the example embodiment, a screw portion is formed on either an outer circumferential surface or an inner circumferential surface of the movable barrel. Moreover, out of an outer circumferential surface and an inner circumferential surface of the fixed barrel, a screw portion is formed on a surface facing the surface on which the screw portion of the movable barrel is formed. The lens apparatus can be configured such that these screw portions are screwed onto each other. In this case, out of the movable barrel and the fixed barrel, an opening can be formed in the barrel screwed outside (the barrel with an inner circumferential surface on which a screw portion is formed), and a pressed portion can be formed in the barrel screwed inside (the barrel with an outer circumferential surface on which a screw portion is formed).

Moreover, in the above description, a spring member serving as an urging member urges a pressing portion toward a pressed portion, so that the pressed portion is pressed. However, the example embodiment can be executed even if the urgent member is not provided. For example, if a fixed barrel is arranged outside (a screw portion is formed on an inner circumferential surface of the fixed barrel), a convex portion serving as a pressing portion is provided on the inner circumferential surface of the fixed barrel. The convex portion is preferably independent from the fixed barrel. If the convex portion is independent, the convex portion can be made of a different material, e.g., resin having good slidability. In such a case, after the movable barrel is set in a predetermined position inside the fixed barrel, the pressing portion is fixed so as to press the pressed portion of the movable barrel with an appropriate pressure.

Each of the example embodiments has been described using an example of a lens apparatus. However, each of the example embodiments can be executed by an image pickup apparatus that includes a camera including an image pickup element, and a lens apparatus that guides light from a subject to the camera. In such a case, the lens apparatus described in the aforementioned example embodiment is desirably used as the lens apparatus which guides light from the subject to the camera.

While the disclosure has been described with reference to example embodiments, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2017-117191, filed Jun. 14, 2017, which is hereby incorporated by reference herein in its entirety.

What is claimed is:

1. A lens apparatus comprising:
a movable barrel holding an optical member, and including a screw portion on an outer or inner surface thereof; and
a fixed barrel including a screw portion, on an inner or outer surface thereof, screwed with the screw portion of the movable barrel, the movable barrel being configured to move in an optical axis direction thereof via the screw portions screwed with each other,
wherein a pressed portion is provided in a groove formed in the screw portion of one of the fixed barrel and the movable barrel whose outer surface includes the screw portion, the groove being different from a screw groove of the screw portion, and a pressing portion is provided for the other of the fixed barrel and the movable barrel whose inner surface includes the screw portion, the pressing portion being provided through a through hole formed in the screw portion of the other of the fixed barrel and the movable barrel, and
wherein the pressed portion is pressed by the pressing portion.

2. The lens apparatus according to claim 1, wherein the pressed portion is formed at a position exposed to the through hole, and
wherein the lens apparatus further comprises a cover member and an urging member that urges the pressing portion, the pressing portion and the urging member are inserted into the through hole, and the through hole is covered by the cover member so that the pressing portion urged by the urging member presses the pressed portion.

3. The lens apparatus according to claim 2, wherein in a cross section including the optical axis direction, the through hole is inclined relative to a direction orthogonal to the optical axis direction.

4. The lens apparatus according to claim 1, wherein the groove in which the pressed portion is formed helically.

5. The lens apparatus according to claim 1, wherein the pressed portion is in a cylindrical surface, of the one of the fixed barrel and the movable barrel, having a diameter not greater than a smallest diameter of the screw portion in which the pressed portion is provided.

6. The lens apparatus according to claim 1, wherein a plurality of ones of the pressing portions are provided for the other.

7. The lens apparatus according to claim 1, wherein the pressing portion is fitted into the through hole in the optical axis direction.

8. The lens apparatus according to claim 1, wherein in a cross section including the optical axis direction, the pressed portion is longer than the pressing portion in the optical axis direction.

9. The lens apparatus according to claim 1, wherein the pressing portion has a curved shape convex toward the pressed portion.

10. The lens apparatus according to claim 1, wherein the pressing portion is configured to be rolled on the pressed portion.

11. An image pickup apparatus comprising:
a camera including an image pickup element; and
a lens apparatus directing light to the image pickup element, the lens apparatus comprising:
a movable barrel holding an optical member, and including a screw portion on an outer or inner surface thereof; and
a fixed barrel including a screw portion, on an inner or outer surface thereof, screwed with the screw portion of the movable barrel, the movable barrel being configured to move in an optical axis direction thereof via the screw portions screwed with each other,
wherein a pressed portion is provided in a groove formed in the screw portion of one of the fixed barrel and the movable barrel whose outer surface includes the screw portion, the groove being different from a groove of the screw portion, and a pressing portion is provided for the other of the fixed barrel and the movable barrel whose inner surface includes the screw portion, the pressing portion being provided through a through hole formed in the screw portion of the other of the fixed barrel and the movable barrel, and
wherein the pressed portion is pressed by the pressing portion.

12. A method of manufacturing a lens apparatus, the method comprising steps of:
preparing:
a movable barrel holding an optical member, and including a screw portion on an outer or inner surface thereof; and a fixed barrel including a screw portion, on an inner or outer surface thereof, screwed with the screw portion of the movable barrel, the movable barrel being configured in an optical axis direction thereof via the screw portions screwed with each other, wherein a through hole is formed in one of the fixed barrel and the movable barrel whose inner surface includes the screw portion, a pressing portion being provided through the through hole formed in the screw portion of the one of the fixed barrel and the movable barrel, and a pressed portion is provided in a groove formed in the screw portion of the other of the fixed barrel and the movable barrel at a position thereof exposed to the through hole, the groove being different from a screw groove of the screw portion of the other of the fixed barrel and the movable barrel;

the pressing portion;
an urging member; and
a cover member;

screwing the screw portion included in the fixed barrel with the screw portion included in the movable barrel;

inserting the pressing portion and the urging member into the through hole; and covering the through hole by the cover member so that the pressing portion urged by the urging member presses the pressed portion.

* * * * *